United States Patent
Han et al.

(10) Patent No.: US 12,395,757 B2
(45) Date of Patent: Aug. 19, 2025

(54) IMAGE SENSOR AND OPERATING METHOD THEREOF

(71) Applicant: Samsung Electronics Co., Ltd., Suwon-si (KR)

(72) Inventors: Dong Jae Han, Suwon-si (KR); Jae Jung Park, Suwon-si (KR); Bo Keun Lim, Suwon-si (KR); Gye Hun Choi, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 171 days.

(21) Appl. No.: 18/322,226

(22) Filed: May 23, 2023

(65) Prior Publication Data
US 2024/0163580 A1    May 16, 2024

(30) Foreign Application Priority Data
Nov. 15, 2022    (KR) ........................ 10-2022-0152332

(51) Int. Cl.
*H04N 25/709*    (2023.01)
*H04N 25/772*    (2023.01)
*H04N 25/78*    (2023.01)

(52) U.S. Cl.
CPC ......... *H04N 25/709* (2023.01); *H04N 25/772* (2023.01); *H04N 25/78* (2023.01)

(58) Field of Classification Search
CPC ..... H04N 25/709; H04N 25/772; H04N 25/78
See application file for complete search history.

(56) References Cited

U.S. PATENT DOCUMENTS

| | | | |
|---|---|---|---|
| 7,723,979 B2 | 5/2010 | Ashburn, Jr. et al. | |
| 8,969,782 B2 | 3/2015 | Sohn | |
| 10,529,779 B2* | 1/2020 | Kim | H04N 25/79 |
| 10,687,007 B2 | 6/2020 | Kim et al. | |
| 10,834,351 B2* | 11/2020 | Wang | H04N 25/671 |
| 11,006,060 B2 | 5/2021 | Tsukuda et al. | |
| 11,336,855 B2 | 5/2022 | Nonoshita | |
| 2019/0058010 A1* | 2/2019 | Kim | H10F 39/811 |
| 2020/0169682 A1* | 5/2020 | Wang | H04N 25/709 |
| 2020/0302888 A1 | 9/2020 | Van Ostrand | |
| 2021/0227162 A1* | 7/2021 | Nonoshita | H04N 25/78 |
| 2021/0376729 A1 | 12/2021 | Lee et al. | |

FOREIGN PATENT DOCUMENTS

| | | |
|---|---|---|
| JP | 2006197384 A | 7/2006 |
| JP | 2008199256 A | 8/2008 |
| JP | 2013110705 A | 6/2013 |
| KR | 0172784 B1 | 3/1999 |

* cited by examiner

*Primary Examiner* — Nicholas G Giles
(74) *Attorney, Agent, or Firm* — Harness, Dickey & Pierce, P.L.C.

(57) ABSTRACT

An image sensor and an operating method thereof are provided. The image sensor comprises a voltage generator configured to receive a reference voltage and generate an operating voltage, an analog-to-digital converter (ADC) circuit configured to receive the operating voltage and output a digital code based on the operating voltage, and processing circuitry configured to receive the digital code, and calculate a settling time at which the operating voltage was stabilized based on the digital code and a desired settling threshold voltage value.

20 Claims, 8 Drawing Sheets

IMAGE SENSOR AND OPERATING METHOD THEREOF

CROSS-REFERENCE TO RELATED APPLICATION

This U.S. non-provisional application claims the benefit of priority under 35 U.S.C. 119 to Korean Patent Application No. 10-2022-0152332, filed on Nov. 15, 2022 in the Korean Intellectual Property Office, the contents of which in its entirety are herein incorporated by reference.

BACKGROUND

Various example embodiments of the inventive concepts relate to an image sensor, a system including the image sensor, and/or a method for operating the image sensor.

As mobile devices become smaller, there is a tendency for some functions to be integrated into the mobile device. The functions and performance of an image sensor included in the mobile device have a great impact on the characteristics of the mobile device.

SUMMARY

At least one example embodiment of the inventive concepts provides an image sensor that has improved frame reliability by calculating a settling time of an analog voltage generated in the image sensor.

At least one example embodiment of the inventive concepts also provides a method for operating an image sensor that has improved frame reliability by calculating a settling time of an analog voltage generated in the image sensor.

However, the example embodiments of the inventive concepts are not restricted to the one set forth herein. The above and other aspects of the example embodiments of the inventive concepts will become more apparent to one of ordinary skill in the art to which the inventive concepts pertains by referencing the detailed description of the example embodiments of the inventive concepts given below.

An image sensor according to some example embodiments of the inventive concepts includes a voltage generator configured to receive a reference voltage and generate an operating voltage, an analog-to-digital converter (ADC) circuit configured to receive the operating voltage and output a digital code based on the operating voltage, and processing circuitry configured to receive the digital code, and calculate a settling time at which the operating voltage was stabilized based on the digital code and a desired settling threshold voltage value.

An image sensing system according to some example embodiments of the inventive concepts includes a digital signal processor, and an image sensor configured to receive an image sensor driving signal from the digital signal processor to initiate an image capturing operation, the image sensor including, a voltage generator configured to receive a reference voltage and generate an operating voltage based on the reference voltage, an analog-to-digital converter (ADC) circuit configured to receive the operating voltage, and output a digital code based on the operating voltage, and processing circuitry configured to receive the digital code, and calculate a settling time at which the operating voltage has stabilized based on the digital code and a desired settling threshold voltage value.

A method for operating an image sensor according to some example embodiments of the inventive concepts includes receiving, using a voltage generator, a reference voltage and generating an operating voltage based on the reference voltage, receiving, using an analog-to-digital converter (ADC) circuit, the operating voltage and outputting a digital code based on the operating voltage, and receiving, using processing circuitry, the digital code and calculating a settling time at which the operating voltage was stabilized based on the digital code and a desired settling threshold voltage value.

Specific matters of other example embodiments are included in the detailed description and drawings.

It should be noted that the effects of the example embodiments of the inventive concepts are not limited to those described above, and other effects of the example embodiments of the inventive concepts will be apparent from the following description.

BRIEF DESCRIPTION OF THE DRAWINGS

The above and other aspects and features of one or more the example embodiments of the inventive concepts will become more apparent by describing in detail example embodiments thereof with reference to the attached drawings, in which.

DETAILED DESCRIPTION

Figure 1:
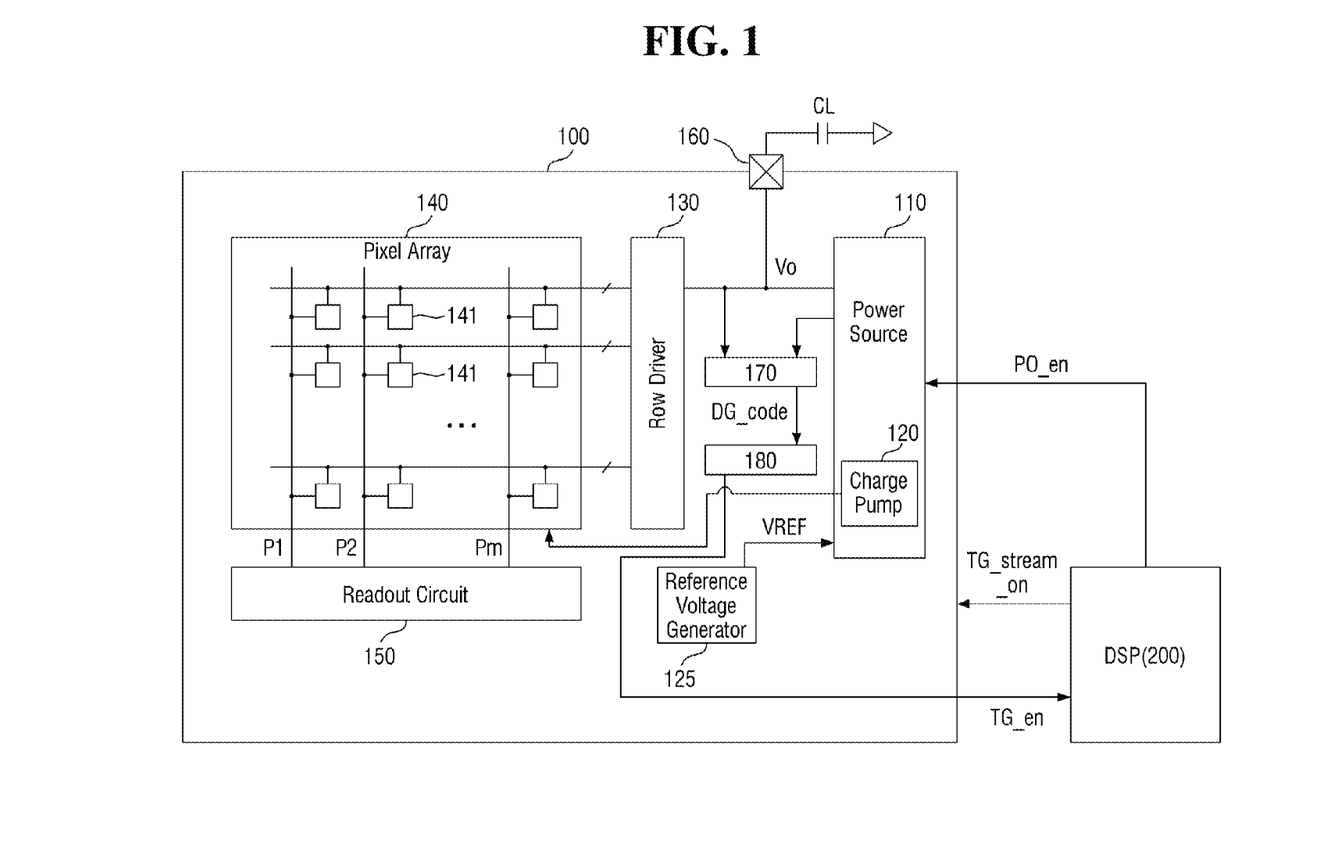
FIGS. 1 and 2 are example block diagrams showing an image sensing system according to some example embodiments.
Figure 2:
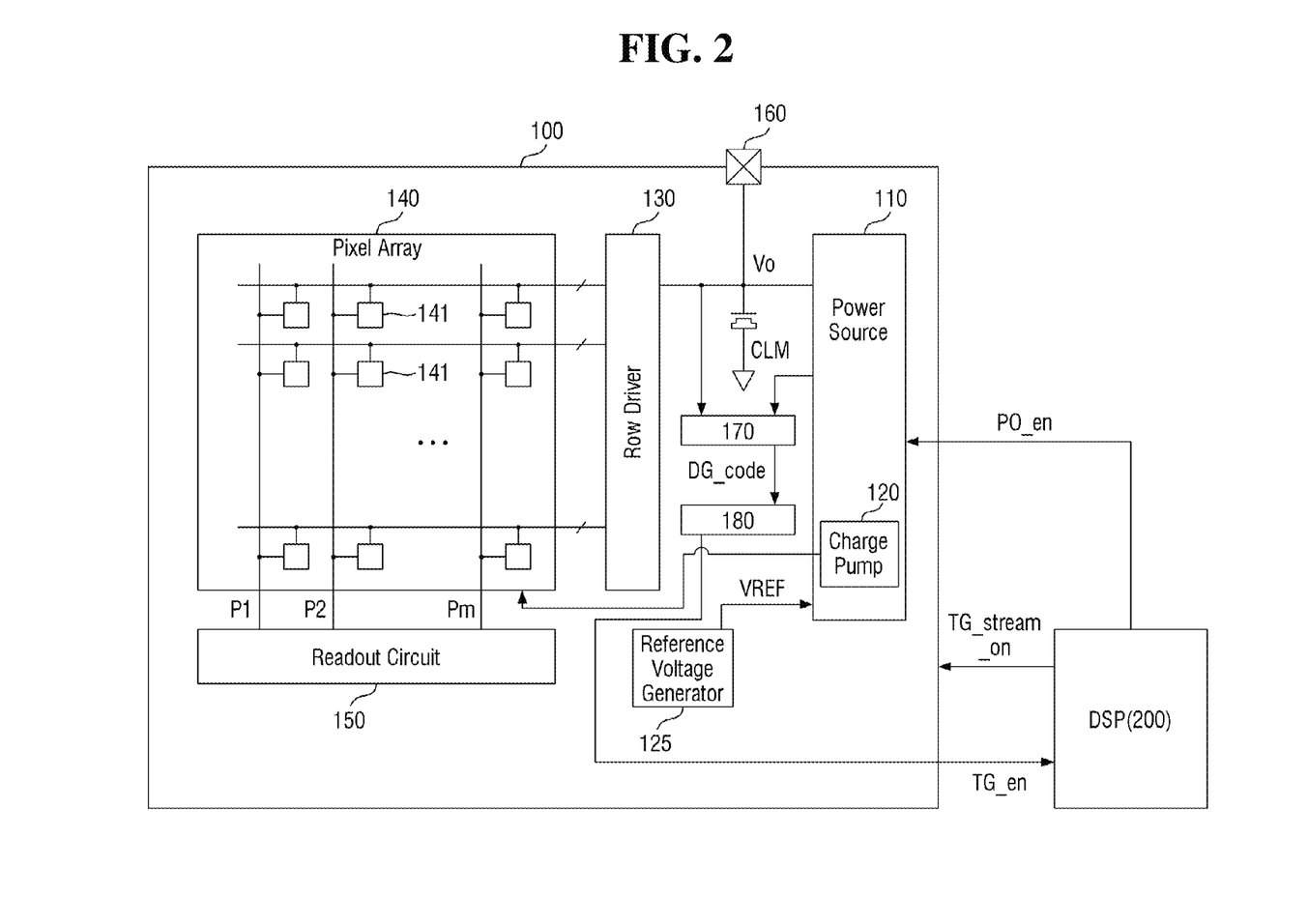

FIGS. 1 and 2 are example block diagrams showing an image sensing system according to some example embodiments.

Referring to FIGS. 1 and 2, the image sensing system according to some example embodiments includes an image sensor and/or a digital signal processor 200, etc., but is not limited thereto, and for example, the image sensing system may include a greater or lesser number of constituent components.

The image sensing system according to some example embodiments may be implemented as a portable electronic device, for example, a digital camera, a video camera, a mobile phone, a smart phone, a tablet, a laptop computer, a PDA (personal digital assistant), a mobile internet device (MID), a wearable computer, a portable gaming console, a vehicle, a drone, an internet of things (IoT) device or an internet of everything (IoE) device, etc., but the example embodiments are not limited thereto. Additionally, according to other example embodiments, the image sensing system may be implemented in non-portable electronic devices, such as a personal computer, a web camera, a monitor, a television, a home appliance, etc.

The digital signal processor 200 may output image signals (and/or display data) corresponding to the image data output from the CMOS image sensor (100 or 100A) to a display.

Although it is not shown, the digital signal processor 200 includes a camera controller, an image signal processor (ISP), and/or an interface (IF), etc.

The image sensor 100 may include a voltage generator 110, a reference voltage generator 125, a row driver 130, a pixel array 140, a readout circuit 150, an analog-to-digital converter (ADC) block 170, and/or a calculator 180, etc.

The image sensor 100 may be implemented as an image sensor chip. The image sensor 100 may be implemented as a front side illumination (FSI) image sensor and/or a back side illumination (BSI) image sensor, but is not limited thereto.

The voltage generator 110 may perform the function of a power supply, generate an operating voltage Vo, and supply the operating voltage Vo to the row driver 130.

In some example embodiments, the voltage generator 110 may include a charge pump 120 which generates an output voltage based on a differential clock signal generated from a clock signal generator. The output voltage of the charge pump 120 is used as the operating power supply of the regulator in the voltage generator 110, enables the voltage generator 110 to generate the operating voltage Vo, and may be directly transferred to the pixel array 140, etc.

The reference voltage generator 125 may generate a reference voltage VREF and provide the reference voltage VREF to the voltage generator 110, etc. For example, the reference voltage generator 125 may be implemented as, but is not limited to, a bandgap voltage reference. The bandgap voltage reference may refer to a voltage reference circuit that is independent of a temperature. According to at least one example embodiment, the reference voltage VREF may be supplied to the voltage generator 110, and the operating voltage Vo may be generated based on the reference voltage VREF, etc., but the example embodiments are not limited thereto.

The row driver 130 may generate the one or more control signals using and/or based on the operating voltage Vo. For example, the row driver 130 may perform the functions of a row driver and a decoder, but is not limited thereto. For example, the row driver 130 may generate one or more control signals for controlling one or more operations of each of the pixels 141 placed in each selected row.

Figure 3:
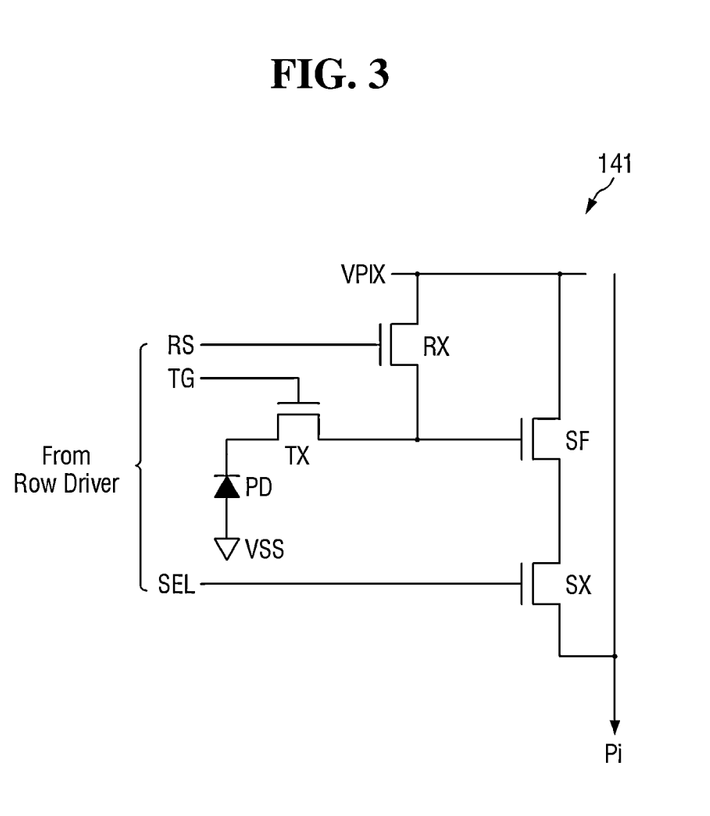
FIG. 3 is a circuit diagram for explaining a pixel according to at least one example embodiment.

The pixel array 140 may include a plurality of pixels 141. For example, each structure of the plurality of pixels 141 may include at least one photoelectric conversion element PD and a plurality of transistors TX, RX, SF, and SX, as shown in FIG. 3 as an example, but the example embodiments are not limited thereto. According to at least one example embodiment, each pixel 141 may include a plurality of photoelectric conversion elements. Any one of the plurality of photoelectric conversion elements may be a pixel which may generate a long-exposure image signal, and the other of the plurality of photoelectric conversion elements may be a pixel which may generate a short-exposure image signal, but the example embodiments are not limited thereto.

Each of the plurality of pixels 141 may be implemented as, but is not limited to, a photodiode, a photo transistor, a pinned photodiode, and/or a photogate, etc.

An analog pixel signal which is output from each pixel 141 placed in each column may be transmitted to the readout circuit 150 through each of the column lines P1 to Pm. The readout circuit 150 may perform analog-to-digital conversion on each analog pixel signal that is output through each of the column lines P1 to Pm.

The image sensor 100 may further include at least one pad 160 connected to a voltage transmission line that supplies the operating voltage Vo. At least one external capacitor CL may be connected between the pad 160 and ground. The pad 160 may refer to a pin to which the external capacitor CL may be connected, but the example embodiments are not limited thereto.

According to at least one example embodiment, the image sensor 100A of FIG. 2 differs from the image sensor 100 of FIG. 1 in that a capacitor CLM is implemented as an internal MOS capacitor, otherwise the structure and function of the image sensor 100 shown in FIG. 1 are identical to, or similar to, the structure and function of the image sensor 100A shown in FIG. 2. However, the example embodiments are not limited thereto, and the image sensor may have a different configuration and/or structure than shown in FIGS. 1 and 2.

Additionally, referring to FIGS. 1 and 2, the image sensors 100 and 100A according to some example embodiments include an ADC block 170 and/or a calculator 180, but are not limited thereto.

The ADC block 170 may be a circuit block (e.g., ADC circuitry, ADC circuit, etc.) configured as hardwire inside the image sensor (100 or 100A), but is not limited thereto. Additionally, the calculator 180 may be implemented as processing circuitry executing firmware (e.g., calculator firmware, calculator code, calculator computer readable instructions, etc.), but the example embodiments are not limited thereto. The processing circuitry may include hardware including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto. According to some example embodiments, the ADC block 170 may be included in the processing circuitry of the calculator 180 and/or may be implemented as separate processing circuitry, etc.

The ADC block 170 may convert analog signals generated in the image sensor (100 or 100A) into a digital code (DG_code) and output the digital code, but is not limited thereto. The analog signals received by the ADC block 170 may be, for example, signals, such as a reference voltage VREF generated by the reference voltage generator 125, an output voltage of the charge pump 120, and/or voltages generated by the regulator of the voltage generator 110, etc.

Hereinafter, the analog signals received by the ADC block 170 will be described as voltages generated based on the reference voltage VREF generated by the reference voltage generator 125, etc., but the example embodiments are not limited thereto.

Specifically, the ADC block 170 receives the operating voltage Vo generated by the voltage generator 110. The operating voltage Vo may be, for example, a voltage which generates control signals that drive the pixel 141, but is not limited thereto. This will be explained in greater detail in connection to FIG. 3.

FIG. 3 is a circuit diagram for explaining the pixel according to at least one example embodiment.

Referring to FIGS. 1 to 3, the pixel 141 may include at least one photoelectric conversion element PD and a plurality of transistors TX, RX, SF, and/or SX, etc., but the example embodiments are not limited thereto.

The row driver 130 may generate a plurality of control signals, such as a transfer control signal TG which may control the operation of the transfer transistor TX, a reset control signal RS which may control the operation of the reset transistor RX, and/or a selection signal SEL which may control the operation of the selection transistor SX, etc., but is not limited thereto. That is, the row driver 130 may generate the control signals TG, RS, and/or SEL, etc., using the operating voltage Vo supplied from the voltage generator 110. For example, the row driver 130 may include drivers that may generate control signals TG, RS, and SEL for each row, etc.

The reset transistor RX is connected between a metal line (and/or node) for supplying voltage VPIX and a floating diffusion node FD. The floating diffusion node may refer to a floating diffusion region. A transistor SF that functions as a source follower is connected between the metal line and the selection transistor SX.

Although FIG. 3 shows at least one example embodiment in which the reset transistor RX and the transistor SF are connected to the metal line that supplies the voltage VPIX, the first metal line connected to the reset transistor RX and the second metal line connected to the transistor SF may be separated from each other, but the example embodiments are not limited thereto. At this time, the voltage supplied to the first metal line may differ from the voltage supplied to the second metal line, etc.

Referring to FIGS. 1 and 2 again, the ADC block 170 receives the operating voltage Vo and may generate a digital code DG_code based on the operating voltage Vo, thereby converting analog signals into digital code and/or digital signal. The operating voltage Vo may be a voltage transmitted to the row driver 130, or may be a voltage transmitted directly to the pixel array 140 without going through the row driver 130.

The calculator 180 determines whether the analog signal inside the image sensor (100 or 100A) (e.g., the reference voltage (VREF) generated by the reference voltage generator 125, etc.) has stabilized using the digital code DG_Code received through the ADC block 170.

Hereinafter, although the signal by which the calculator 180 determines the stabilization will be described as the reference voltage VREF, the example embodiments of the inventive concepts are not limited thereto, and the signal may be a voltage generated by a regulator and/or another analog signal, etc.

The operation of the image sensing system according to some example embodiments will now be described together with FIG. 4.

Figure 4:
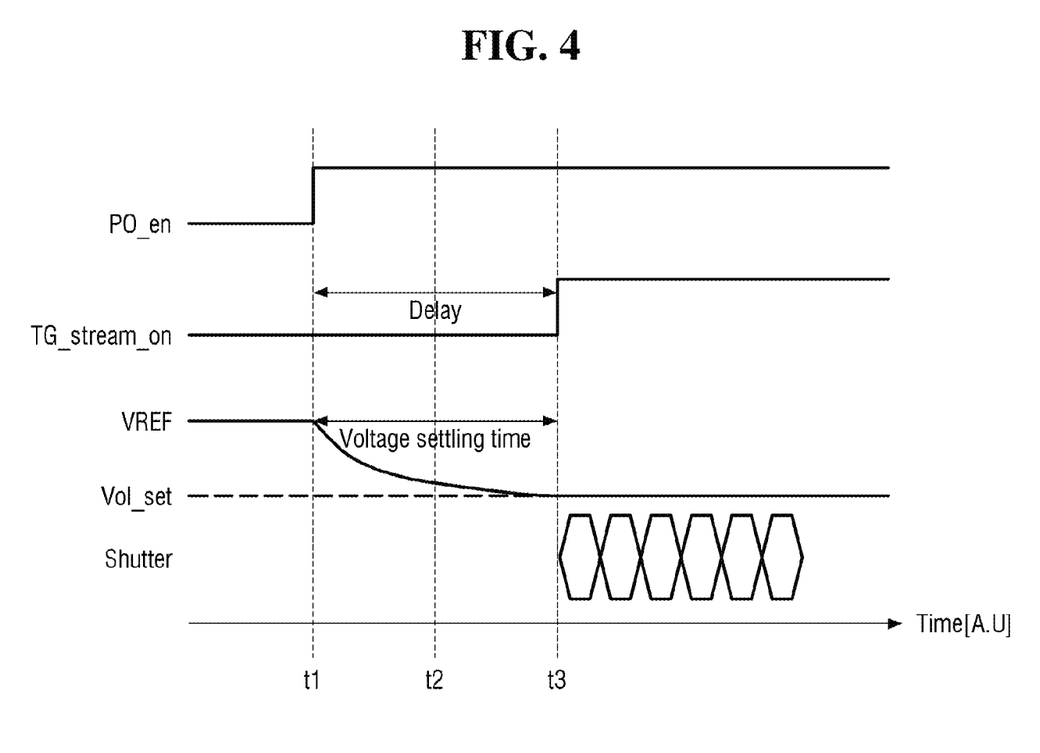
FIG. 4 is an example timing diagram showing an operation of the image sensing system according to some example embodiments.

FIG. 4 is an example timing diagram showing the operation of the image sensing system according to some example embodiments.

Referring to FIGS. 1, 2 and 4, according to some example embodiments, the calculator 180 first sets a settling voltage Vol_set (e.g., a desired voltage, a desired threshold voltage, etc.) at which the reference voltage VREF is stabilized and/or considered to be stabilized. The settling voltage Vol_set may be set to different voltage values depending on a plurality of modes (e.g., a binning mode, a capture mode, etc.) in which the image sensor (100 or 100A) is operated by the digital signal processor 200, etc., but is not limited thereto.

The calculator 180 may calculate a time, e.g., a voltage settling time, at which the reference voltage VREF reaches the settling voltage Vol_set. That is, the calculator 180 calculates the time (e.g., a third time point t3 as shown in FIG. 4) at which the reference voltage VREF reaches the settling voltage Vol_set, and transmits a stabilization completion signal TG_en to the digital signal processor 200 at that time (e.g., a third time point t3 as shown in FIG. 4), but the example embodiments are not limited thereto.

Upon receiving the stabilization completion signal TG_en, the digital signal processor 200 transmits an image sensor driving signal TG_stream_on to the image sensor (100 or 100A) at the voltage settling time (e.g., the third time point t3), etc. The digital signal processor 200 transmits the shutter according to and/or based on the frame to the image sensor (100 or 100A) for each row after the voltage settling time is reached (e.g., the third time point t3), etc.

Transmission of the shutter may proceed sequentially from a 0th row to a last row, but the example embodiments are not limited thereto.

A shutter time may be the operating time of the drive circuit 141 for resetting the charges accumulated in the photoelectric conversion element PD of FIG. 3. The shutter time is determined depending on and/or based on the operating method for the drive circuit 140. Through the shutter time, the electrical charges generated and accumulated in the pixels 141 of each row are removed. After the shutter time, the photoelectric conversion element PD of each pixel 141 may newly generate and accumulate electrical charges. The electrical charges may be accumulated until a reading time.

After the charges are generated and accumulated in each of the pixels 141, the reading time advances sequentially from the 0th row to the last row, but is not limited thereto. The reading time may be the operating time of the drive circuit 140 for generating and reading the pixel signals based on the accumulated charges. The reading time is determined depending on and/or based on the operating method of the drive circuit 140, etc.

Through the reading time, charges accumulated in the photoelectric conversion element PD are transferred to the floating diffusion region FD, and pixel signals are generated based on the charges accumulated in the floating diffusion region FD, etc.

That is, the image sensor (100 or 100A) does not perform the shutter operation for each frame at the time (e.g., first time t1) at which the digital signal processor 200 transmits the image sensor driving signal TG_stream_on for turning on the image sensor (100 or 100A) to the image sensor (100 or 100A), and instead performs the shutter operation for each frame after a delay time period corresponding to the settling time and/or stabilization time of the analog signals provided to the ADC block 170, etc.

That is, the image sensor (100 or 100A) performs the shutter operation after delaying from the first time t1 at which the image sensor driving signal TG_stream_on is received from the digital signal processor 200 for a specific interval, a desired time interval, a desired delay interval, etc.

The time to be delayed may correspond to a time period during which the analog signal in the image sensor (100 or 100A) stabilizes. At this time, if the stabilization times for a plurality of analog signals are different from each other, the shutter operation may be performed by defining the time for the analog signal with the greatest and/or longest stabilization time period as the delay time interval.

As a result, it is possible to remove and/or reduce a situation in which the shutter operation is performed before the analog signal in the image sensor (100 or 100A) has stabilized and therefore reduces and/or prevents bad frames from being captured by the image sensor, etc. Consequently, the frame reliability of the images captured by an image sensor is improved by one or more of the example embodiments.

Figure 5:
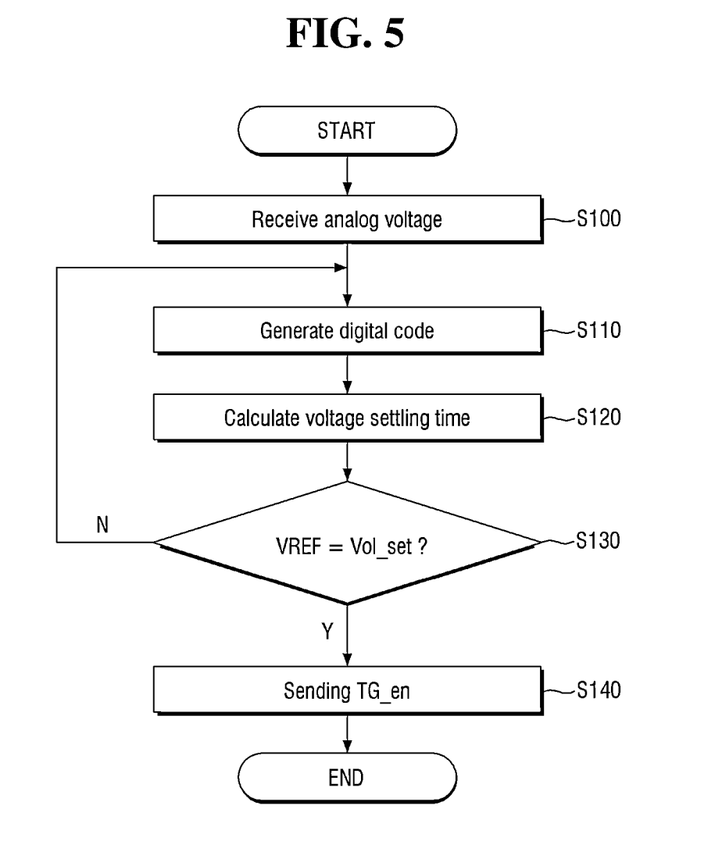
FIG. 5 is an example flow chart showing the operation of the image sensing system according to some example embodiments.

FIG. 5 is an example flow chart showing the operation of the image sensing system according to some example embodiments. Hereinafter, repeated parts of the above example embodiments will be omitted.

Referring to FIGS. 1, 2 and 5, in operation S100, the ADC block 170 receives at least one analog voltage signal, such as the operating voltage Vo, the charge pump 120 output voltage, and/or reference voltage VREF, etc.

In operation S110, the ADC block 170 generates a digital voltage code DG_code based on the received analog signal(s) by converting the analog voltage signal(s) into the digital voltage code DG_code, but the example embodiments are not limited thereto.

In operation S120, the calculator 180 may calculate the voltage settling time at which the digital voltage code DG_code reaches the settling voltage Vol_set. That is, the calculator 180 calculates the time (e.g., the third time point t3 in FIG. 4) at which the analog voltage signals, such as reference voltage VREF, etc., reaches the settling voltage Vol_set based on the value of the DG_code and the settling voltage Vol_set.

In operation S130, the calculator 180 determines whether the voltage signals, e.g., reference voltage VREF, etc., have reached the settling voltage Vol_set.

If the calculator 180 determines that the voltage signals, e.g., reference voltage VREF, etc., have not reached the settling voltage Vol_set (N), the calculator 180 returns to S110 and S120 and receives a new and/or updated digital voltage code DG_code (corresponding to new and/or updated analog voltage codes) from the ADC block 170 and recalculates whether the voltage signals, such as reference voltage VREF, etc., have reached the settling voltage Vol_set.

If the voltage signals, e.g., reference voltage VREF, etc., have reached the settling voltage Vol_set (Y), in operation S140, the calculator 180 transmits the stabilization completion signal TG_en to the digital signal processor 200.

Figure 6:
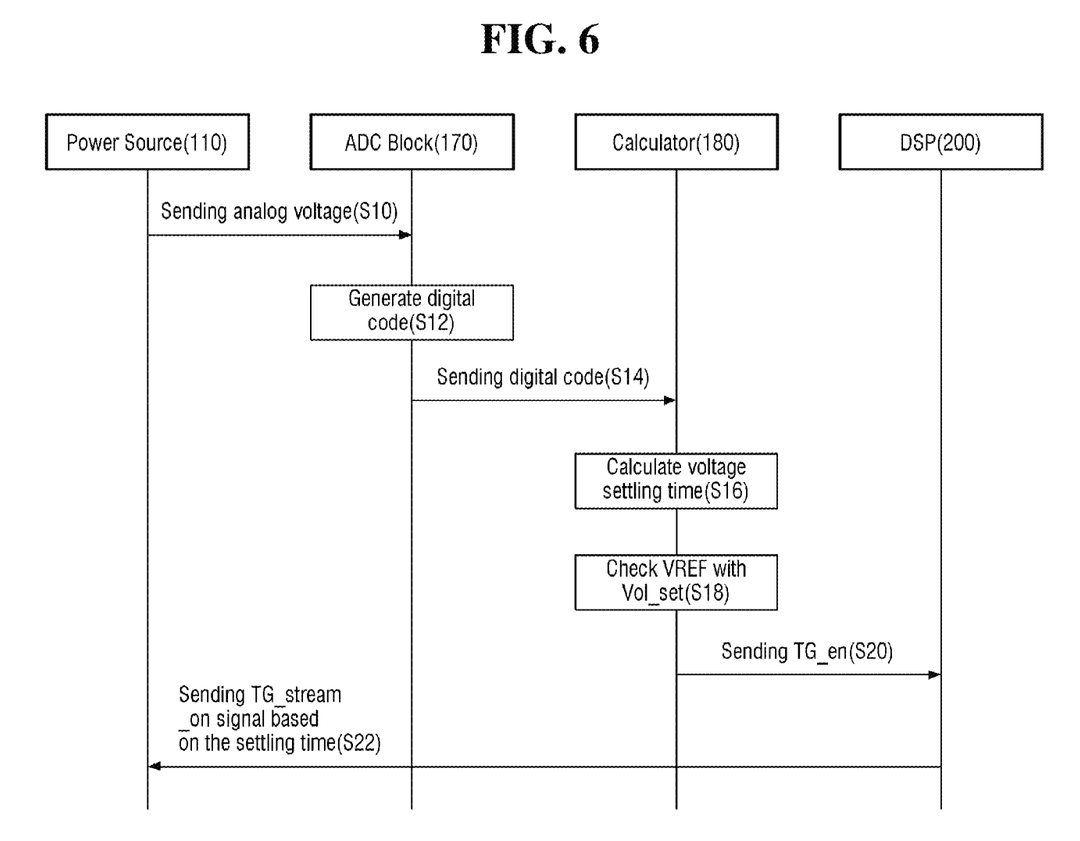
FIG. 6 is an example ladder diagram showing the operation of an image sensing system according to some example embodiments.

FIG. 6 is an example ladder diagram showing the operation of the image sensing system according to some example embodiments.

Referring to FIGS. 1, 2 and 6, in operation S10, the ADC block 170 receives one or more of the analog voltage signals, e.g., the operating voltage Vo, the charge pump 120 output voltage, and/or reference voltage VREF, etc.

In operation S12, the ADC block 170 generates a digital voltage code DG_code generated by converting the one or more analog voltage signals, such as operating voltage Vo, the charge pump 120 output voltage, and/or reference voltage VREF, etc., into the digital voltage code DG_code.

In operation S14, the ADC block 170 transmits the digital voltage code DG_code to the calculator 180.

In operation S16, the calculator 180 may calculate the voltage settling time at which the one or more voltage signals, e.g., the operating voltage Vo, the charge pump 120 output voltage, and/or reference voltage VREF, etc., reaches the settling voltage Vol_set (e.g., a desired voltage, a desired threshold voltage, etc.). That is, the calculator 180 calculates the time (e.g., the third time point t3 as shown in FIG. 4) at which the voltage signal(s), e.g., reference voltage VREF, etc., reaches the settling voltage Vol_set, but the example embodiments are not limited thereto.

In operation S18, the calculator 180 determines whether the voltage signals, e.g., reference voltage VREF, etc., reaches the settling voltage Vol_set.

In operation S20, if the voltage signals, e.g., reference voltage VREF, etc., reaches the settling voltage Vol_set, the calculator 180 transmits the stabilization completion signal TG_en to the digital signal processor 200.

In operation S22, the digital signal processor 200 transmits the image sensor driving signal TG_stream_on to the voltage generator 110 based on the settling time described above, thereby causing the voltage generator 110 to generate the operating voltage Vo, etc.

Figure 7:
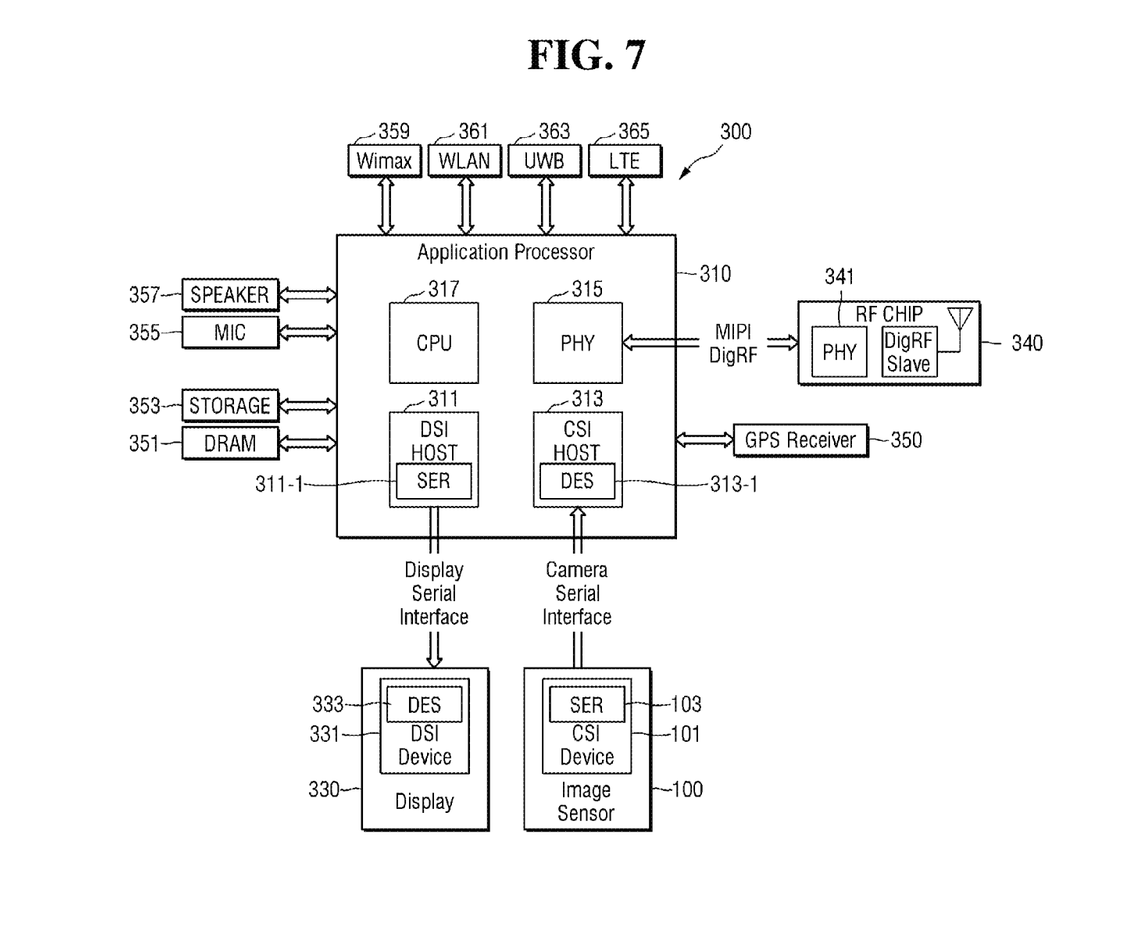
FIGS. 7 and 8 are example block diagrams showing an image processing system including the image sensing system of FIGS. 1 and 2 according to some example embodiments.
Figure 8:
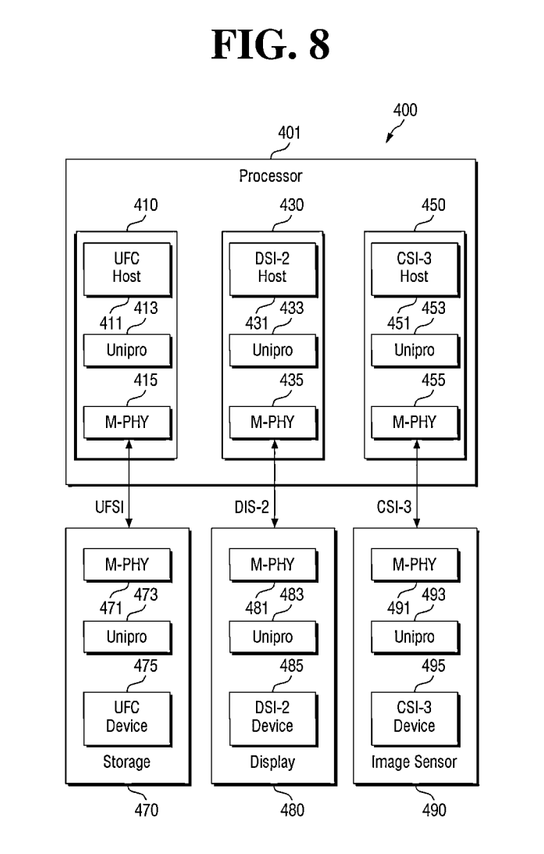

FIGS. 7 and 8 are example block diagrams showing an image processing system including the image sensing systems of FIGS. 1 and 2 according to some example embodiments.

Referring to FIG. 7, an image processing system 300 may be implemented as a mobile device which may use MIPI® (mobile industry processor interface), but the example embodiments are not limited thereto, and other interfaces may be implemented. The image processing system 300 may include at least one application processor (AP) 310, an image sensor 100, and/or a display 330, etc., but is not limited thereto.

A camera serial interface (CSI) host 313 implemented in the AP 310 may perform communication, e.g., serial communication, etc., with the CSI device 101 of the image sensor 100 through the CSI, but the example embodiments are not limited thereto, and for example, a parallel interface may be used, etc. According to some example embodiments, the CSI host 313 may include a deserializer 313-1, and the CSI device 101 may include a serializer 103, but the example embodiments are not limited thereto.

The display serial interface (DSI) host 311 implemented in the AP 310 may perform the serial communication with the DSI device 331 of the display 330 through the DSI, etc. According to some example embodiments, the DSI host 311 may include a serializer 311-1, and the DSI device 331 may include a deserializer 333, but are not limited thereto. Each of the deserializer DES and the serializer SER may process an electrical signal and/or an optical signal.

The image processing system 300 may further include a radio frequency (RF) chip 340 which may communicate with the AP 310. A physical layer PHY 315 of the AP 310 and a PHY 341 of the RF chip 340 may send and/or receive data according to and/or based on MIPI DigRF, but is not limited thereto. The RF chip 340 may include an antenna and/or a DigRF slave, etc. The AP 310 may further include at least one CPU 317 which may control one or more of a plurality of components, such as the components 311, 313, and/or 315, etc.

The image processing system 300 may further include a global positioning system (GPS) receiver 350, a memory device 351, such as a dynamic random access memory (DRAM), etc., a data storage device 353 implemented as a non-volatile memory device such as a NAND flash memory, etc., a microphone 355, and/or a speaker 357, etc., but the example embodiments are not limited thereto.

The image processing system 300 may communicate with at least one external wireless communication device using at least one communication protocol (or communication standard), for example, a WiMAX (worldwide interoperability for microwave access; 359), a WLAN (Wireless LAN; 361), a UWB (ultra-wideband; 363) or LTE™ (long term evolution; 365), etc. Additionally, the image processing system 300 may communicate with at least one external wireless communication device using Bluetooth and/or Wi-Fi, etc.

Referring to FIG. 8, the image processing system 300 may be implemented as a mobile device, but the example embodiments are not limited thereto, and for example, the image processing system 300 may be a stationary device, etc.

The image processing system 400 may include at least one processor 401, a storage device 470, a display 480, and/or an image sensor 490, but is not limited thereto, and for example, may include a greater or lesser number of constituent components, etc.

According to at least one example, the mobile device including the image sensor 490 include a mobile phone, a smart phone, a tablet, a laptop computer, a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a wearable computer, internet of things (IoT) device, internet of everything (IoE) device, a drone, an e-book, or the like.

The image sensor 490 may refer to an image sensor chip (100 or 100A, collectively "100") explained in connection with FIGS. 1 to 6, but is not limited thereto.

The processor 401 may control the storage device 470, the display 480, and/or the image sensor 490, etc. The processor 401 may be implemented as an integrated circuit (IC) and/or system-on-chip, etc. The processor 401 may include a plurality of host devices, such as host devices 410, 430 and/or 450, etc. Here, the host device may refer to a hardware component and/or a circuit implemented in the processor 401, etc.

A first host device 410 may control the operation of the universal flash storage (UFS) storage 470 through a UFS interface (UFSI), but is not limited thereto. The first host device 410 may include a UFS host 411, a link layer 413, for example, a mobile industry processor interface (MIPI) UniPro$^{SM}$, and a physical layer 215, for example, MIPI M-PHY$^{SM}$, but the example embodiments are not limited thereto. According to some example embodiments, the MIPI UniPro$^{SM}$ may be replaced by MIPI LLI (Low Latency Interface), etc. The UFS interconnect (UIC) layer may include either MIPI UniPro$^{SM}$ and/or MIPI LLI, and MIPI M-PHYφ, but is not limited thereto.

The UFS storage 470 may include a MIPI M-PHY 471, a UniPro 473, and/or a UFS device 475, etc. The MIPI M-PHY 471 may control transmission of data between the UFS interface (UFSI) and the UniPro 471, etc. The UniPro 471 may control transmission of data between the MIPI M-PHY 471 and the UFS device 475, etc. The UFS device 475 may be flash-based memory (e.g., a NAND flash memory or a NOR flash memory), but is not limited thereto.

The second host device 430 may control the operation of the display 480 through the DSI (Display Serial Interface)-2, but is not limited thereto. The second host device 430 may include a DSI-2 host 431, a link layer 433, for example, MIPI UniPro$^{SM}$, and/or a physical layer 435, for example, MIPI M-PHY$^{SM}$, etc., but the example embodiments are not limited thereto.

The display 480 may include a MIPI M-PHY 481, a UniPro 483, and/or a DSI-2 device 485, etc. As mentioned above, each UniPro 433 and 483 may be replaced with a MIPI LLI, but is not limited thereto. The MIPI M-PHY 481 may control transmission of data between the DSI-2 and the UniPro 483. The UniPro 483 may control transmission of data between the MIPI M-PHY 481 and the DSI-2 device 485. The DSI-2 device 485 may refer to a display panel, but is not limited thereto. The display panel may refer to a TFT-LCD, a LED display panel, an OLED display panel, an AMOLED display panel, and/or a flashable display panel, etc.

A third host device 450 may control the operation of the image sensor 490 through a CSI (Camera Serial Interface)-3, but the example embodiments are not limited thereto. The third host device 450 may include a CSI-3 host 451, a link layer 453, for example, a MIPI UniPro$^{SM}$, and/or a physical layer 455, for example, a MIPI M-PHY$^{SM}$, etc.

The image sensor 490 may include a MIPI M-PHY 491, a UniPro 493, and/or a CSI-3 device 495, etc. As mentioned above, each UniPro 453 and 493 may be replaced with a MIPI LLI, but is not limited thereto. The MIPI M-PHY 491 may control transmission of data between the CSI-3 and the UniPro 493. The UniPro 493 may control transmission of data between the MIPI M-PHY 491 and the CSI-3 device 495. The CSI-3 device 495 may include a pixel array and peripheral circuits for processing pixel signals that are output from the pixel array, etc.

Although various example embodiments of the inventive concepts have been described above with reference to the accompanying drawings, the example embodiments of the inventive concepts are not limited to the above example embodiments, and may be manufactured in various forms. Those of ordinary skill in the art will appreciate that the example embodiments of the inventive concepts may be embodied in other specific forms without changing the technical spirit or essential features of the inventive concepts. Accordingly, the above-described example embodiments are to be considered in all respects as illustrative and not restrictive.

What is claimed is:

1. An image sensor comprising:
    a voltage generator configured to receive a reference voltage and generate an operating voltage;
    an analog-to-digital converter (ADC) circuit configured to receive the operating voltage and output a digital code based on the operating voltage; and
    processing circuitry configured to receive the digital code, and calculate a settling time at which the operating voltage was stabilized based on the digital code and a desired settling threshold voltage value.

2. The image sensor of claim 1, wherein the processing circuitry is further configured to transmit a stabilization completion signal to an external destination in response to the operating voltage being stabilized.

3. The image sensor of claim 2, wherein the voltage generator is further configured to:
    receive an image sensor driving signal from the external destination; and
    generate the operating voltage in response to the image sensor driving signal being received from the external destination.

4. The image sensor of claim 1, further comprising:
    a charge pump configured to generate an output voltage based on a plurality of differential clock signals,
    wherein the ADC circuit is further configured to receive the output voltage of the charge pump, and output the digital code based on the output voltage; and
    the processing circuitry is further configured to,
    receive the output digital code, and
    calculate the settling time at which the output voltage of the charge pump was stabilized based on the digital code and the desired settling threshold voltage value.

5. The image sensor of claim 4,
    wherein the processing circuitry is further configured to transmit a stabilization completion signal to an external destination in response to the output voltage of the charge pump being stabilized.

6. The image sensor of claim 4, further comprising:
a pixel array including a plurality of pixels; and
a row driver configured to,
  receive the operating voltage, and
  generate at least one control signal for controlling the pixel array,
wherein the charge pump is further configured to output the output voltage to the row driver or directly to the pixel array.

7. The image sensor of claim 1,
wherein the processing circuitry is further configured to execute calculator firmware.

8. An image sensing system comprising:
a digital signal processor; and
an image sensor configured to receive an image sensor driving signal from the digital signal processor to initiate an image capturing operation,
the image sensor including,
  a voltage generator configured to receive a reference voltage and generate an operating voltage based on the reference voltage;
  an analog-to-digital converter (ADC) circuit configured to receive the operating voltage, and output a digital code based on the operating voltage; and
  processing circuitry configured to receive the digital code, and calculate a settling time at which the operating voltage has stabilized based on the digital code and a desired settling threshold voltage value.

9. The image sensing system of claim 8, wherein the processing circuitry is further configured to transmit a stabilization completion signal to the digital signal processor in response to the operating voltage being stabilized.

10. The image sensing system of claim 9, wherein the voltage generator is further configured to:
receive the image sensor driving signal from the digital signal processor; and
generate the operating voltage in response to the image sensor driving signal being received from the digital signal processor.

11. The image sensing system of claim 8, wherein
the image sensor further comprises a charge pump configured to generate an output voltage based on a plurality of differential clock signals;
the ADC circuit is further configured to receive the output voltage of the charge pump, and output the digital code; and
the processing circuitry is further configured to receive the digital code, and calculate the settling time at which the output voltage of the charge pump was stabilized based on the digital code and the desired settling threshold voltage value.

12. The image sensing system of claim 11,
wherein the processing circuitry is further configured to transmit a stabilization completion signal to the digital signal processor in response to the output voltage of the charge pump being stabilized.

13. The image sensing system of claim 11, wherein the image sensor further includes:
a pixel array including a plurality of pixels; and
a row driver configured to receive the operating voltage, and generate at least one control signal for controlling the pixel array,
wherein the charge pump is further configured to output the output voltage of the charge pump to the row driver or directly to the pixel array.

14. The image sensing system of claim 8,
wherein the processing circuitry is further configured to execute calculator firmware.

15. A method for operating an image sensor, the method comprising:
receiving, using a voltage generator, a reference voltage and generating an operating voltage based on the reference voltage;
receiving, using an analog-to-digital converter (ADC) circuit, the operating voltage and outputting a digital code based on the operating voltage; and
receiving, using processing circuitry, the digital code and calculating a settling time at which the operating voltage was stabilized based on the digital code and a desired settling threshold voltage value.

16. The method for operating the image sensor of claim 15, further comprising:
transmitting, using the processing circuitry, a stabilization completion signal to an external destination in response to the operating voltage being stabilized.

17. The method for operating the image sensor of claim 16, further comprising:
receiving an image sensor driving signal from the external destination; and
generating, using the voltage generator, the operating voltage in response to the image sensor driving signal being received from the external destination.

18. The method for operating the image sensor of claim 15, further comprising:
generating, using a charge pump, an output voltage based on a plurality of differential clock signals;
receiving, using the ADC circuit, the output voltage of the charge pump;
outputting, using the ADC circuit, the digital code based on the output voltage;
receiving, using the processing circuitry, the digital code; and
calculating, using the processing circuitry, a settling time at which the output voltage of the charge pump was stabilized based on the digital code and the desired settling threshold voltage value.

19. The method for operating the image sensor of claim 18, further comprising:
transmitting, using the processing circuitry, a stabilization completion signal to an external destination in response to the output voltage of the charge pump being stabilized.

20. The method for operating the image sensor of claim 18, further comprising:
receiving, using a row driver, the operating voltage; and
generating, using the row driver, at least one control signal for controlling a pixel array including a plurality of pixels;
wherein the output voltage of the charge pump is transferred to the row driver as the operating voltage, or the out voltage of the charge pump is directly transferred from the charge pump to the pixel array.

* * * * *